United States Patent Office 3,365,646
Patented Jan. 23, 1968

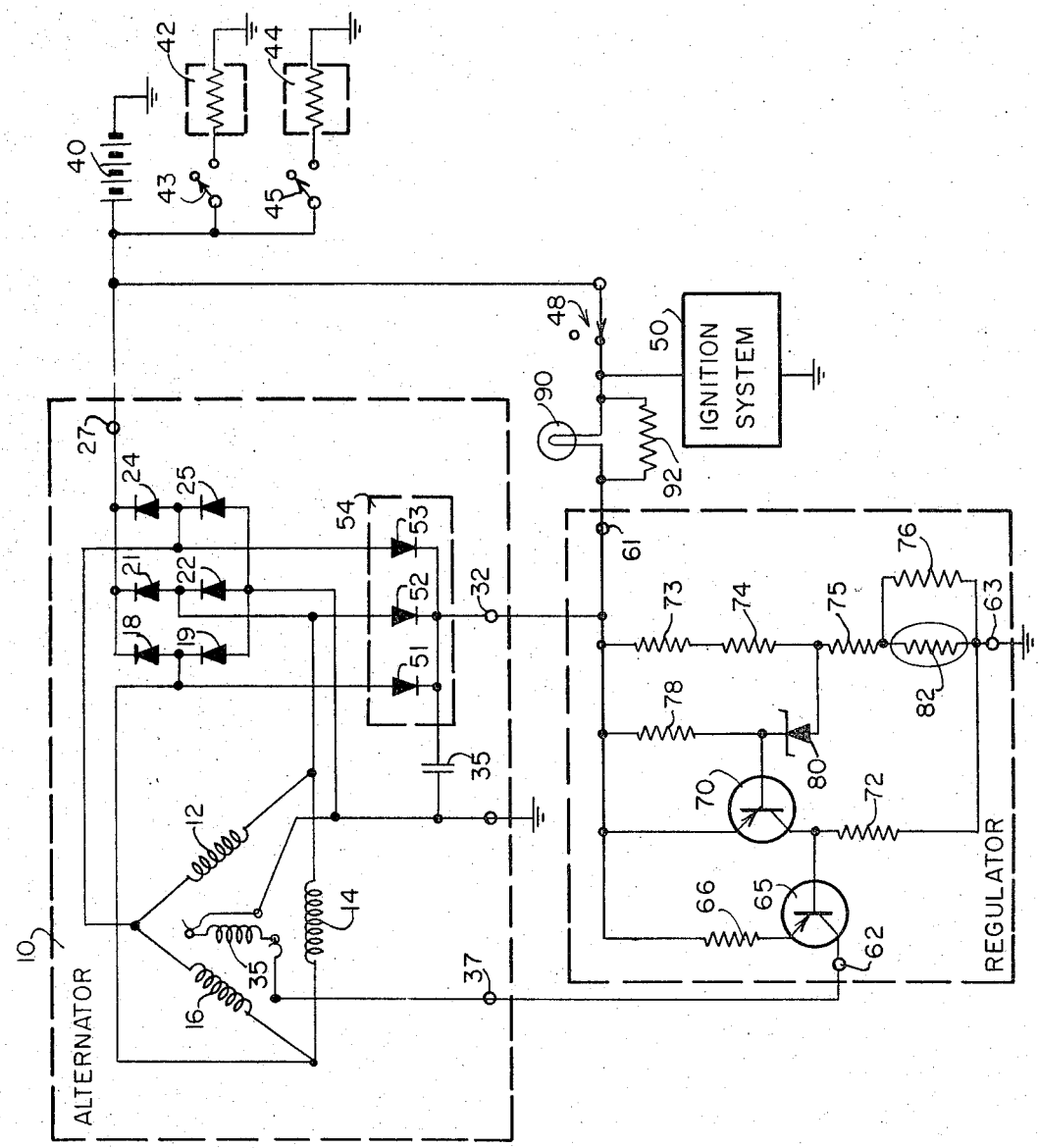

3,365,646
ELECTRONIC APPARATUS
Franklin C. Brewster, Franklin Park, Ill., assignor to Motorola, Inc., Franklin Park, Ill., a corporation of Illinois
Filed June 8, 1965, Ser. No. 462,267
1 Claim. (Cl. 320—64)

ABSTRACT OF THE DISCLOSURE

Vehicular electrical system having three phase alternator and full wave rectifier for charging battery and supplying current for the vehicle. Three diodes are connected from the alternator to a separate output terminal to provide an isolated direct current voltage supplied through a transistor voltage regulator to the field of the alternator. An indicator lamp and/or a resistor is connected through the ignition switch to the battery and to the voltage regulator and provides initial field excitation current from the battery to the field of the alternator. The indicator lamp thus indicates discharge of the battery, and the current therethrough is cut off when the alternator voltage rises to charge the battery.

---

This invention relates to vehicular electrical systems, and more particularly to such a system which incorporates an alternator with a voltage regulated battery charging circuit.

Many present day vehicles, such as automobiles, use a generator to charge a battery for the electrical system, and a warning light which is visible on the dashboard to indicate when the battery is not being charged by the generator. It is recognized that the use of an alternator plus suitable associated rectifiers to produce direct current can offer advantages in an automobile or other type of engine driven vehicle, over an automotive direct current generator with its commutator and brushes. Such an alternator system may, however, present difficulties because of high cost, less than desired reliability and inadequate regulation of power output.

In Patent No. 3,138,751 issued to the present inventor, and assigned to the assignee of the present invention, there is described a system which utilizes one or more further diodes, in addition to the diodes of a full wave rectifier, to connect the alternator output to the storage battery. The voltage regulator then senses the voltage at the junction between the rectifier and the further diode, and an indicator light is connected to take advantage of any voltage drop which may exist across the further diode in the event the alternator output is below the potential of the storage battery. Such a system has proved highly satisfactory in commercial use. Where it is desired that the alternator be constructed for a relatively high current output (for example 70 to 120 amps.), the cost of the additional diode or diodes is a substantial factor, and the heat and/or resulting power losses developed therein is objectionable.

Accordingly, it is an object of this invention to provide an alternator rectifier system for producing relatively high current outputs with improved efficiency.

Still another object of the invention is to provide an improved vehicular electrical system of high efficiency and low cost.

A feature of the invention is the provision, in an alternator rectifier system, of an additional rectifier for connecting the armature windings of the alternator to the voltage regulator to supply the sensing voltage and field power therefor.

Another feature of the invention is the provision, in a vehicular electrical system having a storage battery, a voltage regulator and a battery charge indicator connecting the storage battery to the voltage regulator, of an alternator, which may be three-phase with an additional rectifier connecting the armature winding to the junction between the voltage regulator and the battery charge indicator for supplying current through the regulator to the alternator field.

The drawing is a schematic diagram of a vehicular electrical system incorporating the invention.

In accordance with the invention, a vehicular electrical system includes an alternator rectifier structure, a storage battery, and a voltage regulator. The voltage regulator is for regulating the field current of the alternator in accordance with the magnitude of voltage applied to the regulator by the alternator. The alternator may include a three-phase armature winding and a field winding for producing current in the armature winding according to the field winding current supplied to the field winding from the regulator. A main three-phase full wave rectifier connects the armature winding to the storage battery to supply charging current thereto. Additional rectifiers connect the armature winding to the voltage regulator and cooperate with the main rectifier to supply a direct current voltage thereto. This direct voltage is sensed by the regulator and the field current is supplied in accordance with three-phase voltage produced by the alternator.

This invention applies to alternator systems wherein the alternating current is rectified to provide direct current, and the direct current is sensed to control the field current of the alternator and thereby control the alternator output voltage. The alternator may be either single phase or multiple phase, and is illustrated in a three-phase system which is commonly used.

In the figure, the alternator 10, which may be driven from the engine of the vehicle in which the electrical system is incorporated, includes armature windings 12, 14 and 16 connected in delta. As an alternative, a Y connection could also be used. The corners of the delta are connected to the respective interconnections of the rectifier pairs 18, 19 and 21, 22 and 24, 25 of the full wave power rectifier circuit. The anodes of the rectifiers 19, 22 and 25 are all interconnected to the frame of the alternator or a reference ground. The cathodes of rectifiers 18, 21 and 24 are connected to an output terminal 27 of the alternator. A direct current voltage, positive with respect to the reference point, appears at terminal 27 in response to full wave rectification of the three-phase output of the armature windings 12, 14 and 16 and the bank of rectifiers.

A field winding 35 of the alternator is connected through the usual slip rings and brushes to the ground conductor or reference frame of the alternator and to a field current supply terminal 37. A storage battery 40, providing for example 12 volts, is connected between the output terminal 27 of the alternator and the reference point of the electrical system. Various items of electrical equipment are shown representatively connected to the battery 40. These include an electrical load 42 series connected with a control switch 43 across the battery 40, and an electrical load 44 series connected with the switch 45 across the battery 40. The electrical loads 42, 44 could represent such items as a starter for the vehicle, lights for the vehicle, a radio for the vehicle or any other piece of electrical equipment.

An ignition switch 48 includes a movable contact connected to the positive terminal of battery 40 and a fixed contact connected to the ignition circuit 50 for the internal combustion engine of the vehicle.

While various types of voltage regulators can be utilized in the system, a transistorized regulator may be advantageous from the standpoint of improved control and reliability. The transistorized voltage regulator 60 has an input terminal 61 connected to the output terminal 32 of the alternator 10. The voltage of output terminal 32 is derived from three silicon rectifiers or diodes 51, 52 and 53 which together form the rectifier device 54. The anodes of diodes 51, 52 and 53 are each connected to a respective one of the corners of the delta of the armature windings 12, 14 and 16. Diodes 51, 52 and 53 cooperate with diodes 19, 22 and 25 of the power rectifier circuit to form a full wave three-phase rectifier. The diodes 51, 52 and 53 are connected in parallel with diodes 18, 21 and 24, respectively, of the power rectifier circuit and isolate the output at terminal 32 from the output at terminal 27. This prevents discharge of the battery through the regulator and/or the field winding when the alternator is not in operation. As the current required is small, the diodes 51, 52 and 53 may be semiconductor diodes which are commercially available at low cost. A capacitor 55 connects the cathodes of diodes 51, 52 and 53 to the reference potential to filter the potential at terminal 32.

The regulator 60 further includes a field current supply terminal 62 connected to terminal 37 of the alternator. Regulator 60 is connected to ground, or the reference point for the electrical system, through a suitable reference conductor 63. It may be seen that the PNP power transistor 65 of the regulator 60 has a collector electrode connected to terminal 62 and an emitter electrode connected through a resistor 66 to the terminal 61. Accordingly, the emitter-collector current path of transistor 65 conducts current from the output terminal 32 of the alternator to the field winding 35 of the alternator.

The current or potential for the base electrode of transistor 65 is varied in accordance with the output voltage of the alternator 10 at its terminal 32 in order to control the current in field winding 35 for regulating the alternator output to a substantially constant voltage. A base control circuit for transistor 65 is established by the emitter-collector electrode current path of PNP control transistor 70 and the resistor 72 which are connected in series between terminal 61 and the reference point 63. The junction of the collector of transistor 70 and the resistor 72 is connected to the base of transistor 65.

A voltage divider including series resistors 73, 74, 75 and 76 is connected between terminal 61 and terminal 63. A further resistor 78 is series connected with the zener diode 80 between the terminal 61 and the junction of resistors 74 and 75. The junction of resistor 78 and diode 80 is connected with the base electrode of transistor 70. The voltage divider 73–76 will thus establish a potential on the zener diode 80 so that it can conduct in a reverse direction when a given voltage exists across the terminals 61 and 63 of the voltage regulator. Once the diode 80 is in reverse conduction there will be a constant potential established at the base of transistor 70 so that any voltage variation at the terminal 61 will be reflected as a potential change at the emitter electrode of transistor 70.

Accordingly, as the potential of the alternator at terminal 32 increases above the predetermined value at which the bias circuit for the base of transistor 70 has been designed, diode 80 will conduct to establish a fixed potential at the base electrode of transistor 70, and its emitter potential will increase to cause increased conduction through the emitter to collector path of transistor 70. Correspondingly, the potential of the base electrode of transistor 65 will be established at a more positive potential to reduce the emitter-collector conduction therein and thus reduce the current supplied to the rotating field winding 35 of the alternator. With reduced field current, the output potential of the alternator will decrease so that the potential on regulator terminal 61 is low enough to cause cutoff of diode 80 and a resultant decrease in conduction of transistor 70 so that the conduction of transistor 65 is increased. This will bring about an increased current applied to the field winding 35 causing the voltage output of the alternator to again increase. Such cycling of the alternator output potential above and below the established regulation point of the regulator 60 will continue at a faster or slower rate depending upon the speed at which the alternator turns and its output voltage, in order to average the current through the field winding 35 to provide a regulated potential from the alternator.

A temperature dependent resistor 82 is connected across the resistor 76 in the voltage divider 73–76 to temperature compensate the regulator 60. It is preferable that the value of resistor 82 vary with ambient temperature in a manner to effectively "track" the potential requirements of the storage battery 40 at different temperatures. Thus, for example, if the battery 40 is of the lead-acid type such that it will require a higher charging potential at low ambient temperatures, then the resistor 82 should change in value at such low temperatures to cause an increase in the value of the output potential of the alternator at which the regulator establishes such output.

An indicator light 90, sometimes referred to as a no charge or tell tail light, is connected between the terminal 32 of the alternator and the fixed terminal of the ignition switch 48. This lamp is shunted by a resistor 92. It is the purpose of light 90 to indicate whether or not the alternator is properly charging the battery. When the ignition switch 48 is first closed the light 90 will be energized by the battery through a current path including resistor 66, the emitter and collector of transistor 65 and the field winding 35. This will indicate that the alternator is not charging the battery. However, after the engine of the vehicle has been started and the alternator is developing a potential at terminals 27 and 32 which exceeds the potential of the storage battery 40, the lamp 90 will be essentially extinguished. This is because the direct current potentials at terminals 27 and 32, between which the lamp 90 is connected, are at essentially the same potential. Thus, the lamp 90 will be off when the battery is being charged.

With this system there are no relays to control the field current which may present problems in use. The charge light 90 will indicate trouble and also provides a path for initial starting field current for the alternator. This operation is similar to that described in Patent No. 3,138,951 previously referred to. In the present arrangement the additional rectifier for isolating the voltage regulator from the battery does not carry the load current so that the losses developed therein are reduced. For an alternator having an output rating exceeding 40 amps., the efficiency of mechanical power input to electrical power output is improved considerably. Losses are further reduced as size increases beyond this rating. The three-phase diodes connecting the armature windings to the voltage regulator may have small capacity since they are required only to conduct the alternator field current. These can therefore be very inexpensive and the losses introduced thereby are quite small.

For the foregoing reasons it will be seen that the invention provides an improved alternator for a vehicular electrical system which has high efficiency and which can be constructed at low cost.

I claim:

1. A storage battery charging system for a vehicular electrical system having a storage battery and an ignition switch connected thereto, said system including in combination, an alternator having three-phase armature winding means with first, second and third conductors providing the respective three-phase output voltages, said alternator further having field winding means for producing current in said armature winding means according to the field current supplied to said field winding means, three-phase rectifier means having a first portion including a first group of three rectifiers individually connecting said first, second and third conductors to a reference potential and a second group of three rectifiers individually connecting said first, second and third conductors to a first output terminal for connection to the common connection between the storage battery and the ignition switch to supply charging current to the storage battery, said rectifier means having a second portion including a third group of three rectifiers individually connecting said first, second and third conductors to a second output terminal which is isolated from said first output terminal, a voltage regulator connecting said field winding means to said second output terminal for regulating the field current for said alternator in accordance with the magnitude of voltage at said second output terminal, and indicator light means connected between said second terminal and a third terminal for connection to the ignition switch, said indicator light means completing a conductive path for supplying initial field excitation current from the storage battery to said field winding means through the ignition switch and said voltage regulator and being energized by said initial field excitation current, said indicator light means being de-energized in response to operation of said alternator to produce substantially the same voltage at said first and second output terminals.

References Cited

UNITED STATES PATENTS

| | | | |
|---|---|---|---|
| 2,789,265 | 5/1957 | Halliday | 322—28 |
| 3,210,645 | 10/1965 | Domann | 322—28 |
| 3,215,923 | 11/1965 | Oster | 322—28 X |
| 3,293,536 | 12/1966 | Byles | 322—28 |
| 2,738,457 | 8/1953 | Gilchrist | 322—28 |
| 2,874,346 | 1/1955 | Orvis | 322—25 X |
| 3,009,091 | 11/1961 | Hallidy | 322—28 |
| 3,164,765 | 1/1965 | Burson | 322—73 X |
| 3,185,916 | 5/1965 | Brewster | 322—73 X |
| 3,271,601 | 9/1966 | Raven | 310—68 |
| 3,290,582 | 12/1966 | Roosma et al. | 322—68 |

MILTON O. HIRSHFIELD, *Primary Examiner.*

R. V. LUPO, *Assistant Examiner.*

Disclaimer and Dedication 3,365,646.—*Franklin C. Brewster*, Franklin Park, Ill. ELECTRONIC APPARATUS. Patent dated Jan. 23, 1968. Disclaimer and Dedication filed Jan. 3, 1977, by the assignee, *Motorola, Inc.*
Hereby disclaims and dedicates to the Public claim 1 of said patent.
[*Official Gazette April 12, 1977.*]